M. POMEROY.
HOLDER ATTACHMENT.
APPLICATION FILED JAN. 4, 1915.
1,156,370.
Patented Oct. 12, 1915.
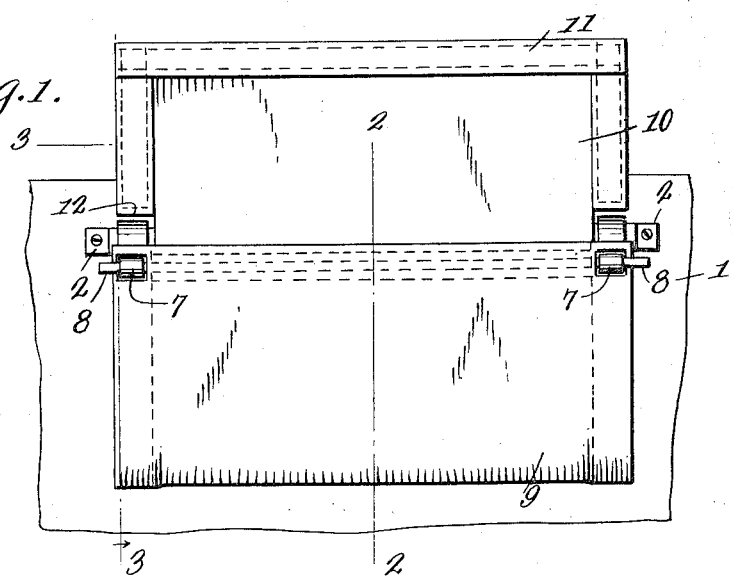
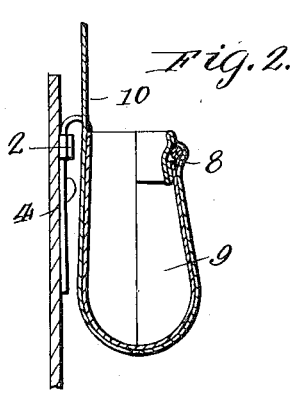
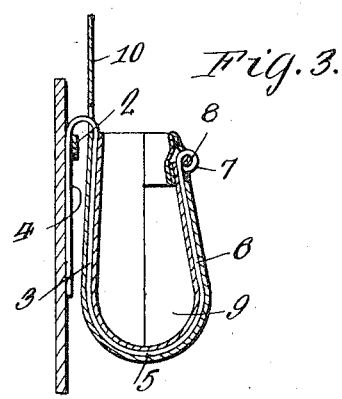
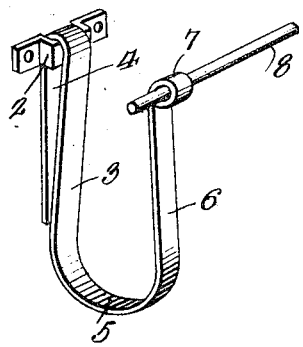
Witnesses
Guy M Spring
Carroll Bailey
Inventor
Maggie Pomeroy
By Richard B Owen
Attorney

UNITED STATES PATENT OFFICE.

MAGGIE POMEROY, OF McKENZIE, NORTH DAKOTA.

HOLDER ATTACHMENT.

1,156,370. Specification of Letters Patent. Patented Oct. 12, 1915.

Application filed January 4, 1915. Serial No. 514.

*To all whom it may concern:*

Be it known that I, MAGGIE POMEROY, a citizen of the United States, residing at McKenzie, in the county of Burleigh and State of North Dakota, have invented certain new and useful Improvements in Holder Attachments, of which the following is a specification.

This invention relates to a holder attachment for vehicles, such as buggies, automobiles and the like, and has for its primary object to provide a holder for various articles which can be readily and easily attached to the dash board of the vehicle to position the holder for convenient use.

An object of the invention is to provide a simply constructed frame for supporting a holder in the form of a bag, and to so construct the frame that a new bag may be readily applied to the frame upon destruction of the old bag.

With these and other objects in view the invention consists in the novel features of construction, combination and arrangement of parts as will be hereinafter more fully described, illustrated in the accompanying drawings and claimed.

In the drawings, Figure 1 is a front elevation of a holder constructed in accordance with the invention and shown applied to the dash board of a vehicle. Fig. 2 is a transverse sectional view taken on the line 2—2 of Fig. 1. Fig. 3 is a view similar to Fig. 2 but taken on the line 3—3 of Fig. 1. Fig. 4 is a detailed perspective view of one of the supporting members.

Referring to the drawings by numerals, 1 designates the portion of a dash board of a vehicle which has secured thereto in any suitable manner a pair of brackets 2. The bag holder comprises a pair of supporting members 3 preferably constructed of sheet metal and have their inner ends bent and extended downwardly as at 4 for engagement with the brackets 2. The members 3 are extended downwardly a suitable distance, are bent as at 5 and extend upwardly as at 6, the end of the portion 6 terminating in an eye 7. A rod 8 is passed through the eyes 7 of the members 3 and is adapted to be removably connected therewith.

A bag structure 9 is formed of a double thickness of fabric and the members 3 are adapted to be disposed between the pieces of fabric and sewed or otherwise secured therein. A flap or cover 10 is formed on the rear of the bag, and is reinforced by sewing or otherwise as at 11, and has cut-out portions 12 to accommodate the curved portions formed by the bending of the portions 4. The rod 8 passes through the outer, upper edge of the bag 9 and serves to hold such portion rigidly and prevents sagging of the same. It will be seen that by sliding the rod 8 from engagement with the eyes 7 that the bag may be readily removed from the supporting members 3 and the new bag substituted. It will also be seen that the entire holder may be readily disengaged from the dash board by simply disengaging the portions 4 from the brackets 2.

From the foregoing description taken in connection with the accompanying drawings, it is thought that the construction and operation of the device will be clearly understood, and while I have herein shown and described one specific form of my invention I do not wish to be limited thereto, except for such limitations as the claims may impart.

I claim:

1. A holder attachment comprising a bag, a plurality of supporting members for connecting the bag on the dash board of a vehicle, said supporting members having eyes formed in their outer ends, and a rod slidably engaged with said eyes for supporting one edge of the bag in a rigid position.

2. A holder attachment comprising a bag, a plurality of supporting members for supporting the ends of the bag, means for connecting said members to the dash board of a vehicle, eyes formed in the outer ends of said sliding members, and a rod slidably engaged with said eyes for supporting one edge of the bag in a rigid position.

3. A holder attachment comprising a bag, spaced apart supporting members, supporting the respective ends of the bag, curved extensions formed on each of said members, means for securing said extensions to a supporting structure, eyes formed in the outer ends of said supporting members, and a rod slidably engaged with said eyes for supporting one edge of the bag in a rigid position.

In testimony whereof I affix my signature in presence of two witnesses.

MAGGIE POMEROY.

Witnesses:
HOWARD PAUL,
P. P. BLISS.